United States Patent [19]
Feng et al.

[11] Patent Number: 5,749,090
[45] Date of Patent: May 5, 1998

[54] CACHE TAG RAM HAVING SEPARATE VALID BIT ARRAY WITH MULTIPLE STEP INVALIDATION AND METHOD THEREFOR

[75] Inventors: Taisheng Feng; Donovan Raatz, both of Austin, Tex.

[73] Assignee: Motorola, Inc., Schaumburg, Ill.

[21] Appl. No.: 293,625

[22] Filed: Aug. 22, 1994

[51] Int. Cl.[6] .................................................. G06F 12/12
[52] U.S. Cl. ........................................ 711/135; 711/114
[58] Field of Search ............................. 365/203, 218; 395/472, 468, 471, 445; 711/141, 135, 144, 145, 118

[56] References Cited

U.S. PATENT DOCUMENTS

| | | | |
|---|---|---|---|
| 4,586,133 | 4/1986 | Steckler | 711/138 |
| 4,809,225 | 2/1989 | Dimmler et al. | 365/149 |
| 4,949,308 | 8/1990 | Araki et al. | 365/218 |
| 5,060,136 | 10/1991 | Furney et al. | 711/128 |
| 5,119,485 | 6/1992 | Ledbetter, Jr. et al. | 711/146 |
| 5,212,663 | 5/1993 | Leong | 365/159.01 |
| 5,283,886 | 2/1994 | Nishii et al. | 711/144 |
| 5,371,714 | 12/1994 | Matsuda et al. | 365/230.03 |
| 5,398,204 | 3/1995 | Maruyama | 365/185.3 |
| 5,422,856 | 6/1995 | Sasaki et al. | 365/230.03 |
| 5,479,641 | 12/1995 | Nadir et al. | 711/128 |

*Primary Examiner*—Eddie P. Chan
*Assistant Examiner*—Kevin L. Ellis
*Attorney, Agent, or Firm*—Daniel D. Hill

[57] ABSTRACT

A cache TAG RAM (20) has a TAG array (22, 24) for storing TAG addresses of data stored in a cache memory, and a valid bit array (26, 31). In the cache TAG RAM (20), a valid bit is set for each TAG address to indicate if the TAG address is valid. The valid bit array (26, 31) is located separate from the TAG array (22, 24). During power-up of the cache TAG RAM (20), a multiple step invalidation cycle is used to sequentially invalidate groups of columns of the valid bit array (26, 31). The multiple step invalidation cycle reduces the peak current during an invalidation cycle, thus reducing metal migration.

4 Claims, 4 Drawing Sheets

CACHE TAG RAM HAVING SEPARATE VALID BIT ARRAY WITH MULTIPLE STEP INVALIDATION AND METHOD THEREFOR

FIELD OF THE INVENTION

This invention relates generally to memories, and more particularly, to invalidating a valid bit of a cache TAG random access memory.

BACKGROUND OF THE INVENTION

A cache memory is a relatively small, high speed memory that is used to increase the speed of a data processing system. The access time of the cache memory is close to a propagation delay time of a central processing unit (CPU) in the data processing system. The cache memory stores frequently used instructions or data to reduce the number of accesses between the CPU and a relatively slower main memory, thus improving system performance.

A cache TAG RAM is frequently used to increase the performance of the cache memory. The cache TAG RAM is used to store the addresses of data and instructions currently stored in the cache memory. When data or instructions are requested from the cache memory by the CPU, the cache TAG RAM also receives the address and determines if the requested instructions or data are present in the cache memory. Like the cache memory, the cache TAG RAM has an array of conventional static random access memory (SRAM) cells. If the TAG address and the processor generated address are the same, a cache "hit" occurs, and a match signal of a predetermined logic state is provided by the cache TAG RAM, indicating that the requested data is located in the cache memory. In addition, a valid bit is included as a part of the TAG address for qualifying a valid hit of the address location during a compare cycle of the TAG array. For example, a logic "one" valid bit indicates that the TAG address is valid, and a logic "zero" valid bit indicates that the TAG address is not valid. If the data processor generated address and the TAG address are not the same, and/or the valid bit is not set to indicate a valid address, a cache "miss" occurs, and a match signal of an opposite logic state is provided by the cache TAG, indicating that the requested data is not located in the cache memory.

During operation of the data processing system, an invalidate cycle may also be used to invalidate the cache memory to prevent an incoherence between data in the cache memory and the main memory. An incoherence of data may occur if data is modified in the cache memory but not in the main memory. To prevent the incoherence, the data in the cache may be updated to reflect the current data in the main memory, or the data in the main memory may be changed by a direct memory access from the CPU (central processing unit). During power-up of a conventional cache TAG RAM, an invalidate cycle is used to invalidate all of the valid bits of the cache TAG RAM. Typically, all of the valid bits are invalidated at the same time to establish initial conditions in the cache TAG RAM. All of the word lines are selected and a logic "zero" is written to each of the valid bits of the TAG address. However, as cache memories become larger, the cache TAG RAM also becomes larger, and the amount of peak current required to invalidate the array of valid bits becomes excessive.

SUMMARY OF THE INVENTION

Accordingly, there is provided, in one form, a cache TAG random access memory having a TAG array, a valid bit array, and an invalidate circuit. The TAG array stores an address location for data stored in a cache memory. The valid bit array has a plurality of word lines and a plurality of bit lines arranged in intersecting rows and columns, with a memory cell located at each intersection. The valid bit array stores a valid bit and is separate from the TAG array. The valid bit qualifies a valid hit of the address location during a compare cycle of the TAG array. The invalidate circuit is coupled to the valid bit array, selects the plurality of word lines in the valid bit array, and sequentially invalidates the valid bit array in response to receiving an invalidate control signal.

In another form, a method for invalidating the valid bit array is provided.

These and other features and advantages will be more clearly understood from the following detailed description taken in conjunction with the accompanying drawings.

DESCRIPTION OF A PREFERRED EMBODIMENT

Generally, the present invention provides a cache TAG RAM having a TAG array for storing TAG addresses of data stored in a cache memory. A valid bit is set for each TAG address to indicate if the TAG address is valid. The valid bit is located in a valid bit array that is located separate from the TAG array. A multiple step invalidation cycle is used to invalidate blocks of columns of the valid bit array in an ordered sequence. The multiple step invalidation cycle reduces the peak current during an invalidation cycle, thus reducing metal migration.

Figure 1:
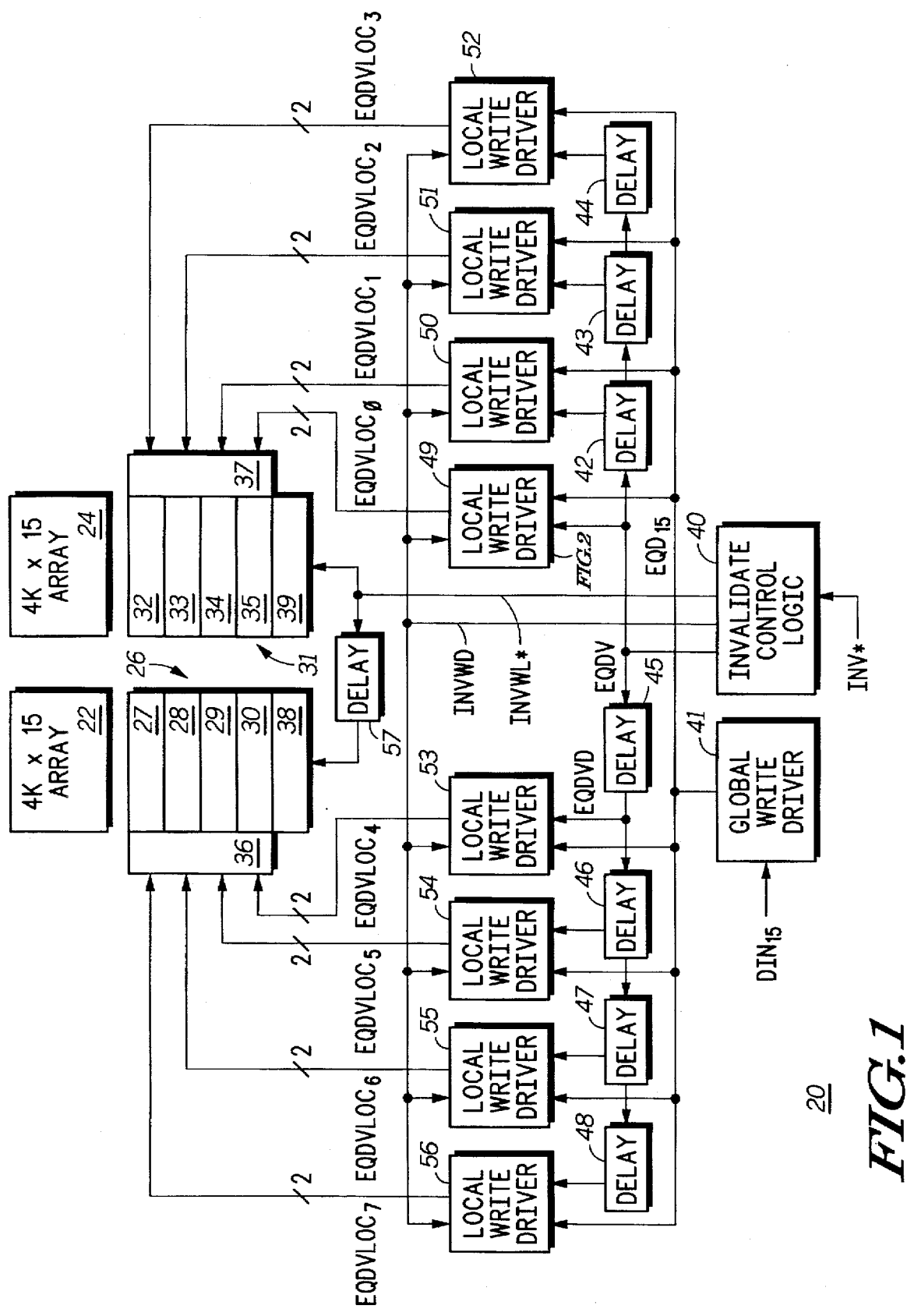
FIG. 1 illustrates in block diagram form, a cache TAG RAM in accordance with the present invention.

The present invention can be more fully described with reference to FIGS. 1–5. FIG. 1 illustrates in block diagram form, cache TAG RAM 20 in accordance with the present invention. Cache TAG RAM 20 includes TAG arrays 22 and 24, valid bit arrays 26 and 31, bit line loads 36 and 37, word line drivers 38 and 39, invalidate control logic 40, global write driver 41, delay elements 42–48, and 57, and local write drivers 49–56.

Figure 3:
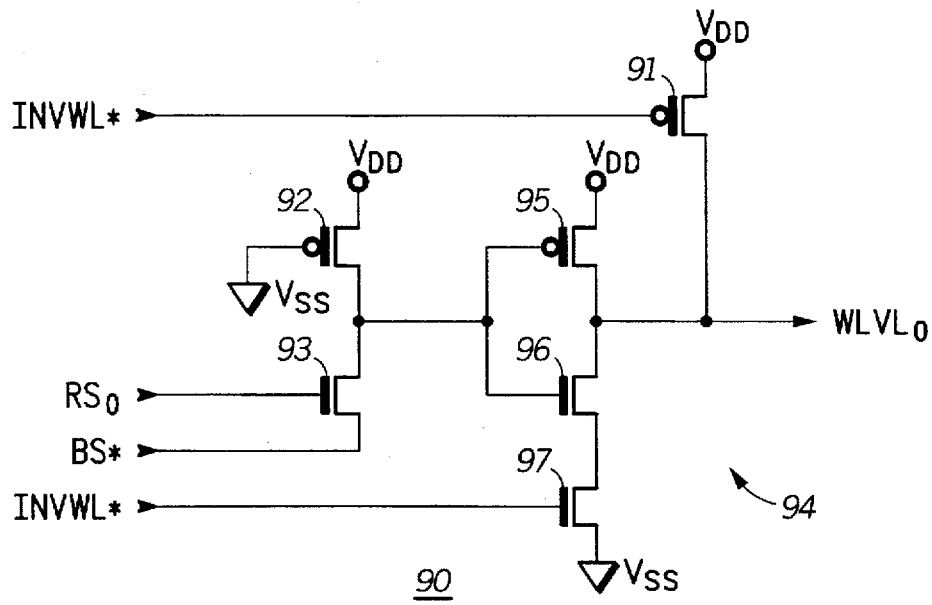
FIG. 3 illustrates in schematic diagram form, a word line driver circuit of the cache TAG RAM of FIG. 1.

Valid bits are included in a separate array from the TAG addresses. The valid bits are for qualifying a valid hit of the address location during a compare cycle of cache TAG RAM 20. Valid array 26 is grouped into blocks of columns 27–30. Valid array 31 is divided into blocks of column 32–35. Invalidate control logic 40 has an input terminal for receiving an external invalidate control signal labeled "INV*", a first output terminal for providing an invalidate word line control signal labeled "INVWL*", and a second output terminal for providing signal "EQDV". Note that an asterisk (*) after a signal name indicates that the signal is a logical complement of a signal having the same name but lacking the asterisk (*). Invalidate word line control signal INVWL* is provided to word line driver circuits 39 and to an input terminal of delay element 57. An example of a word line driver circuit is illustrated in FIG. 3. Delay element 57 has an output terminal connected to word line driver circuits 38. Local write drivers 49–56 each receive an invalidate control signal labeled "INVWD" from invalidate control logic 40 and a signal labeled "EQD$_{15}$" from global write driver 41. Local write driver 49 has an input terminal coupled to the second output terminal of invalidate control logic 40 for receiving write signal EQDV. Delay elements 42, 43, and 44 delay the receipt of write signal EQDV by local write drivers 50 51 and 52, respectively, by a predetermined delay. Each of delay elements 42–56, and 57 include a number of series-connected inverters, where the amount of the predetermined delay is determined by the number of series-connected inverters.

Each of local write drivers 53, 54, 55, and 56 receive a delayed signal corresponding to write signal EQDV after a predetermined delay. For example, local write driver 53 receives a delayed signal labeled "EQDVD" from delay element 45. Local write driver 49 has an output terminal for providing a local write signal labeled "EQDVLOC$_0$" to bit line loads 37. Local write driver 50 has an output terminal for providing a local write signal labeled "EQDVLOC$_1$" to bit line loads 37. Local write driver 51 has an output terminal for providing a local write signal labeled "EQDVLOC$_2$" to bit line loads 37. Local write driver 52 has an output terminal for providing a local write signal labeled "EQDVLOC$_3$" to bit line loads 37. Local write driver 53 has an output terminal for providing a local write signal labeled "EQDVLOC$_4$" to bit line loads 36. Local write driver 54 has an output terminal for providing a local write signal labeled "EQDVLOC$_5$" to bit line loads 36. Local write driver 55 has an output terminal for providing a local write signal labeled "EQDVLOC$_6$" to bit line loads 36. Local write driver 56 has an output terminal for providing a local write signal labeled "EQDVLOC$_7$" to bit line loads 36.

In a preferred embodiment, valid bit array 26 is organized as 32 columns and 128 rows. Therefore, each of the 4 local write drivers 53, 54, 55, and 56 is coupled to 8 columns of valid bit array 26 during an invalidation cycle. The same is true for valid bit array 31. In other embodiments, the valid bit arrays may have other organizations and/or a different number of local write drivers per array. Also, there may be more or less than two valid bit arrays in cache TAG RAM 20.

During an invalidation cycle of cache TAG RAM 20, invalidate control signal INV* is asserted as a logic low. An invalidation cycle may be entered automatically during power-up, or to correct an incoherence between the cache memory (not shown) and main memory (not shown). A logic low invalidate word line control signal INVWL* is provided to word line drivers 39 and delay element 57. All of the word lines in valid bit array 31 are selected. All of the word lines in valid bit array 26 are selected after a predetermined delay. The predetermined delay is determined by the amount of delay provided by delay element 57. Write signal EQDV is provided to local write driver 49 and to delay elements 42 and 45. Local write drivers 49, 50, 51, and 52 write a logic "zero" to the columns of valid bit array 31 by writing to blocks of columns 35, 34, 33, and 32 sequentially, the timing of which is in accordance with the predetermined delay provided by delay elements 42,43, and 44.

In response to write signal EQDV, local write driver 49 (FIG. 2) provides a logic zero local write signal EQDVLOC$_0$ to bit line loads 37 to write a logic zero to all of the memory cells coupled to a block of columns of memory cells. Local write driver 50 writes a logic zero to a block of columns of memory cells after a predetermined delay provided by delay element 42. Local write driver 51 writes a logic zero to a block of columns of memory cells after a predetermined delay provided by delay elements 42 and 43. Local write driver 52 writes a logic zero to a block of columns of memory cells after a predetermined delay provided by delay elements 42, 43, and 44. After all of the columns of valid bit array 31 have been written with a logic zero, the word lines of valid bit array 26 are selected, and groups of columns of valid bit array 26 are written in sequence as determined by delay elements 45, 46, 47, and 48. The delay provided by delay element 45 is approximately equal to the delay provided by delay element 57. This allows all of valid bit array 31 to be invalidated before beginning to invalid valid bit array 26. The invalidating of valid bit array 26 proceeds as described above for valid bit array 31. Note that the word lines of each of valid bit arrays 26 and 31 may also be divided into groups of word lines and invalidated sequentially.

By using the multiple step invalidation cycle described above, peak current is reduced during an invalidation cycle, thus reducing metal migration in cache TAG RAM 20.

During a write or read/compare cycle of cache TAG RAM 20, each of the memory cells of the valid bit arrays can be written to separately by making invalidate control signal INV* inactive, or a logic high. Data signal DIN$_{15}$ is provided as a logic one to global write driver 41 to validate a particular TAG address, and data signal DIN$_{15}$ is provided as a logic zero to invalidate a particular TAG address.

Figure 2:
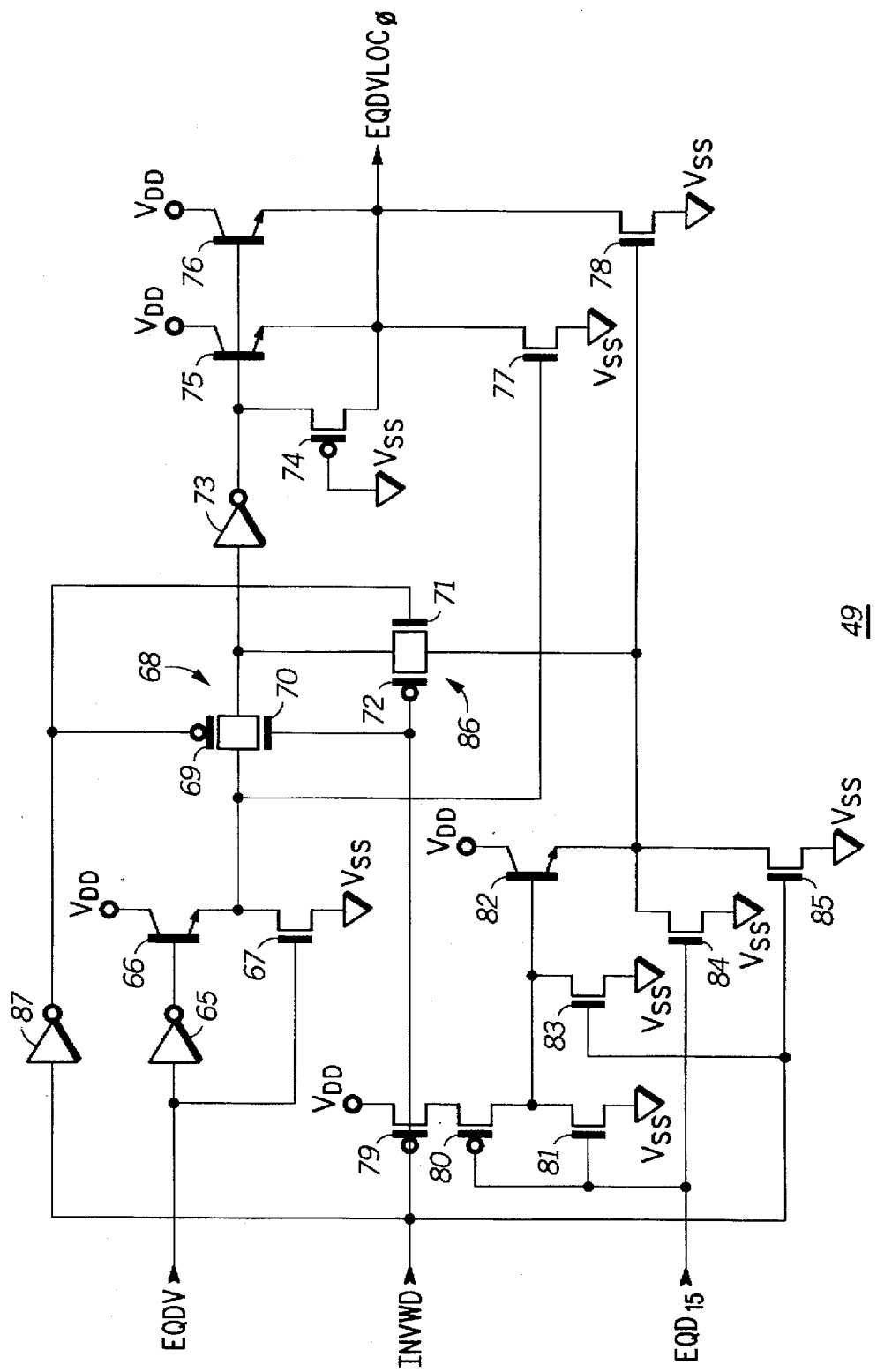
FIG. 2 illustrates in schematic diagram form, a local write driver circuit of the cache TAG RAM of FIG. 1.

FIG. 2 illustrates in schematic diagram form, local write driver circuit 49 of cache TAG RAM 20 of FIG. 1. Local write driver circuit 49 includes inverters 65, 73, and 87, bipolar NPN transistors 66, 75, 76, and 82, N-channel transistors 67, 77, 78, 81, 83, 84, and 85, P-channel transistors 74, 79, and 80, and transmission gates 68 and 86. Transmission gate 68 includes P-channel transistor 69 and N-channel transistor 70. Transmission gate 86 includes P-channel transistor 72 and N-channel transistor 71.

Inverter 65 has an input terminal for receiving write signal EQDV, and an output terminal. NPN transistor 66 has a collector connected to the power supply voltage terminal labeled "$V_{DD}$", a base connected to the output terminal of inverter 65, and an emitter. N-channel transistor 67 has a drain connected to the emitter of NPN transistor 66, a gate connected to the input terminal of inverter 65, and a source connected to a power supply voltage terminal labeled "$V_{SS}$". Inverter 87 has an input terminal for receiving invalidate control signal INVWD, and an output terminal. Transmission gate 68 has a first terminal connected to the emitter of NPN transistor 66, a first control terminal connected to the output terminal of inverter 87, a second control terminal for receiving invalidate control signal INVWD, and a second terminal. Inverter 73 has an input terminal connected to the second terminal of transmission gate 68, and an output terminal. NPN transistor 75 has a collector connected to $V_{DD}$, a base connected to the output terminal of inverter 73, and an emitter for providing local write signal EQDVLOC$_0$. NPN transistor 76 has a collector connected to $V_{DD}$, a base connected to the output terminal of inverter 73, and an emitter connected to the emitter of NPN transistor 75. P-channel transistor 74 has a source connected to the base of both NPN transistors 75 and 76, a gate connected to $V_{SS}$, and a drain connected to the emitters of NPN transistors 75 and 76. N-channel transistor 77 has a drain connected to the emitter of NPN transistor 75, a gate connected to the emitter of NPN transistor 66, and a source connected to $V_{SS}$. N-channel transistor 78 has a source connected to the emitter of NPN transistor 76, a gate, and a drain connected to $V_{SS}$.

Transmission gate 86 has a first terminal connected to the second terminal of transmission gate 68, a second terminal connected to the gate of N-channel transistor 78, a first control terminal for receiving invalidate control signal INVWD, and a second control terminal connected to the output terminal of inverter 87. In a preferred embodiment, $V_{DD}$ is connected to a positive power supply voltage equal to approximately 5 volts, and $V_{SS}$ is equal to zero volts, or ground potential. In other embodiments, $V_{DD}$ and $V_{SS}$ may be connected to different voltages.

P-channel transistor 79 has a source connected to $V_{DD}$, a gate for receiving invalidate control signal INV, and a drain. P-channel transistor 80 has a source connected to the drain of P-channel transistor 79, a gate for receiving data signal $EQD_{15}$, and a drain. NPN transistor 82 has a collector connected to $V_{DD}$, a base connected to the drain of P-channel transistor 80, and an emitter connected to the gate of N-channel transistor 78. N-channel transistor 81 has a drain connected to the drain of P-channel transistor 80, a gate connected to the gate of P-channel transistor 80, and a source connected to $V_{SS}$. N-channel transistor 83 has a drain connected to the base of NPN transistor 82, a gate for receiving invalidate control signal INV, and a source connected to $V_{SS}$. N-channel transistor 84 has a drain connected to the emitter of NPN transistor 82, a gate connected to the gate of N-channel transistor 81, and a source connected to $V_{SS}$. N-channel transistor 85 has a drain connected to the emitter of NPN transistor 82, a gate for receiving invalidate control signal INV, and a source connected to $V_{SS}$.

During an invalidation cycle, invalidate control signal INVWD is a logic high voltage causing transmission gate 68 to be conductive, and transmission gate 86 to be substantially non-conductive. Write signal EQDV is a logic low voltage, and is provided to the input terminal of inverter 65. The output terminal of inverter 65 provides a logic high voltage to the base of NPN transistor 66, causing NPN transistor 66 to be conductive. A logic high voltage at the emitter of NPN transistor 66 is provided to the input terminal of inverter 73 through transmission gate 68. The output terminal of inverter 73 is therefore a logic low voltage, causing NPN transistors 75 and 76 to be substantially non-conductive. The logic high voltage at the emitter of NPN transistor 66 is also provided to the gate of N-channel transistor 77, reducing local write signal $EQDVLOC_0$ to a logic low voltage. The logic low local write signal $EQDVLOC_0$ is provided to bit line loads 36 to write a logic zero to all of the memory cells of the eight columns coupled to local write driver circuit 49.

Because invalidate control signal INVWD is a logic high voltage, P-channel transistor 79 is substantially non-conductive. N-channel transistor 83 is conductive and maintains the base of NPN transistor 82 at a logic low voltage causing NPN transistor 82 to be substantially non-conductive. N-channel transistor 85 is conductive, which maintains the gate of N-channel transistor 78 at a logic low voltage, causing N-channel transistor 78 to be substantially nonconductive.

During a write cycle of cache TAG RAM 20, invalidate control signal INV* is a logic high voltage, causing invalidate control signal INVWD to be a logic low voltage. Write signal EQDV is a logic high voltage, causing N-channel transistor 67 to be conductive, thus reducing the voltage at the gate of N-channel transistor 77 to a logic low, causing N-channel transistor 77 to be substantially non-conductive. Transmission gate 68 is substantially non-conductive, and transmission gate 86 is conductive. If data signal $EQD_{15}$ is a logic high, indicating that a particular TAG address being written to TAG array 22 is valid, P-channel transistor 80 is substantially non-conductive, and N-channel transistor 81 is conductive. The base of NPN transistor 82 is therefore at a logic high voltage, causing NPN transistor 82 to be substantially non-conductive. N-channel transistor 84 is conductive, reducing a voltage at the gate of N-channel transistor 78 to a logic low, causing N-channel transistor 78 to be substantially non-conductive. The input terminal of inverter 73 is reduced to a logic low voltage by N-channel transistor 84, causing a logic high voltage at the output terminal of inverter 73. NPN transistors 75 and 76 are conductive, causing local write signal $EQDVLOC_0$ to be provided as a logic high voltage to bit line loads 37.

FIG. 3 illustrates in schematic diagram form, word line driver circuit 90 of cache TAG RAM 20 of FIG. 1. Word line driver circuit 90 represents one of the word line driver circuits of word line drivers 38 and 39. In a preferred embodiment, there are 128 word line driver circuits similar to word line driver circuit 90 in word line drivers 38 and 39. Each of the word line driver circuits are connected to a word line of valid bit array 26 and valid bit array 31. Word line driver circuit 90 includes P-channel transistors 91, 92, and 95, and N-channel transistors 93, 96, and 97.

P-channel transistor 91 has a source connected to $V_{DD}$, a gate for receiving invalidate word line control signal INVWL*, and a drain. P-channel transistor 92 has a source connected to $V_{DD}$, a gate connected to $V_{SS}$, and a drain. N-channel transistor 93 has a drain connected to the drain of P-channel transistor 92, a gate for a receiving row select signal labeled "$RS_0$", and a source for receiving a block select signal labeled "BS*". P-channel transistors 91 and 95 and N-channel transistors 96 and 97 are coupled together to form NAND logic gate 94. P-channel transistor 95 has a source connected to $V_{DD}$, a gate connected to the drain of P-channel transistor 92, and a drain for providing a word line signal labeled "$WLVL_0$". N-channel transistor 96 has a drain connected to the drain of P-channel transistor 95, a gate connected to the gate of P-channel transistor 95, and a source. N-channel transistor 97 has a drain connected to the source on N-channel transistor 96, a gate for receiving invalidate word line control signal INVWL*, and a source connected to $V_{SS}$.

During an invalidation cycle, a logic low invalidate control signal INV* causes a logic low invalidate word line control signal INVWL* to be provided to the gate of P-channel transistor 91. N-channel transistor 97 is made substantially non-conductive, and P-channel transistor 91 is conductive, causing the voltage of word line $WLVL_0$ to be increased to a logic high, thus selecting the memory cells coupled to word line $WLVL_0$.

During a write or read/compare cycle, invalidate word line control signal INVWL* is a logic high voltage, causing P-channel transistor 91 to be substantially non-conductive. Word line $WLVL_0$ is selected based on the logic states of row select signal $RS_0$ and block select signal BS*.

Figure 4:
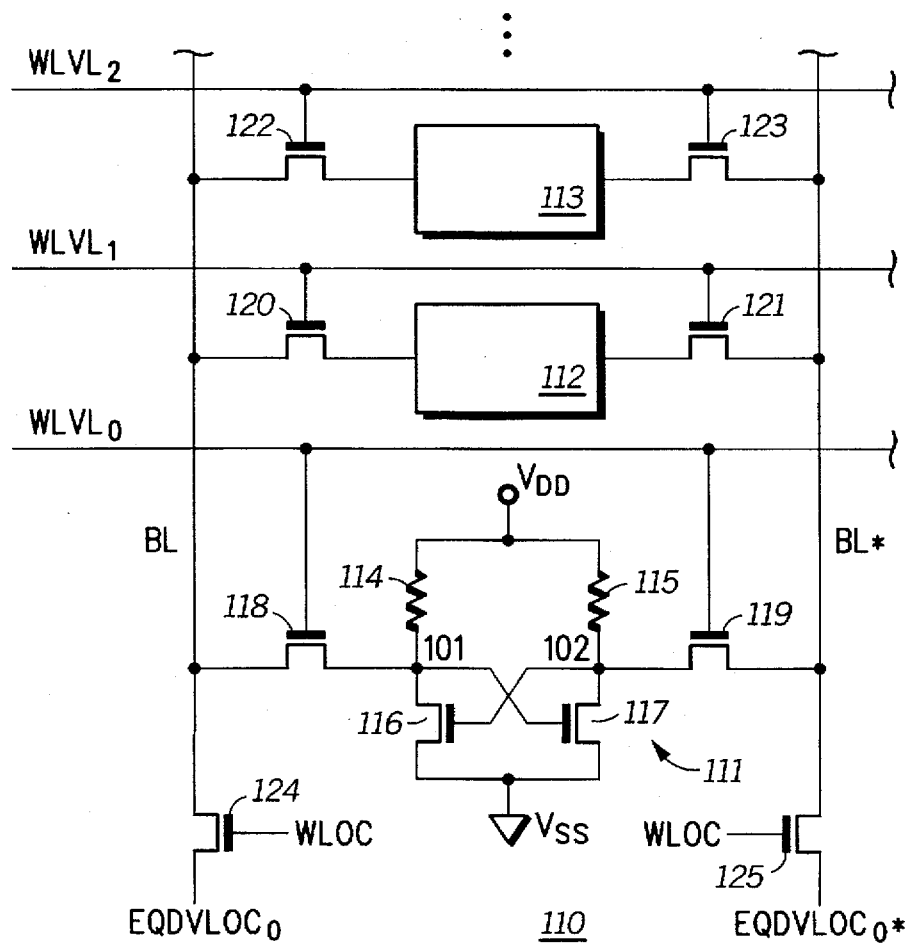
FIG. 4 illustrates in schematic diagram form, a column of memory cells of the cache TAG RAM of FIG. 1.

FIG. 4 illustrates in schematic diagram form, column of memory cells 110 of valid bit arrays 26 and 31 of FIG. 1. Column of memory cells 110 represents one column of memory cells as used in both of valid bit arrays 26 and 31 in a preferred embodiment. Column of memory cells 110 includes conventional four transistor static random access (SRAM) memory cells 111, 112, and 113. Memory cell 111 includes load resistors 114 and 115, pull down transistors 116 and 117, and access transistors 118 and 119. Access transistors 118 and 119 are N-channel MOS (metal-oxide semiconductor) transistors and are for coupling storage nodes 101 and 102 of cell 111 to bit line pair BL/BL* when word line $WLVL_0$ is selected. Memory cells 112 and 113 are similar to memory cell 111. Memory cell 112 is coupled to bit line pair BL/BL* by N-channel transistors 120 and 121, respectively, when word line $WLVL_1$ is selected. Memory cell 113 is coupled to bit line pair BL/BL* by N-channel transistors 122 and 123, respectively, when word line $WLVL_2$ is selected. Note that other embodiments may include six transistor SRAM cells, where the load resistors are replaced with active devices such as P-channel MOS transistors. The active devices may also include thin film transistor (TFT) loads. N-channel transistors 124 and 125 couple bit lines BL/BL* to local write driver circuit 49 (FIG. 1 and FIG. 2) for receiving differential local write signals $EQDVLOC_0/EQDVLOC_0*$ in response to a decoding signal labeled "WLOC" being active. Decoding signal WLOC may be provided by conventional column decoders (not shown). Storage node 101 is coupled to bit line BL by N-channel transistor 118, and storage node 102 is coupled to bit line BL* by N-channel transistor 119. Each of the memory cells is for storing a valid bit for a corresponding TAG address stored in TAG arrays 22 and 24.

A logic zero is simultaneously written to all of the memory cells of column 110 whenever the block of columns to which column 110 is a part, is invalidated during an invalidation cycle. During an invalidation cycle, both of bit lines BL and BL* are discharged and equalized to a potential approximately equal to zero volts, or ground potential. All of the word lines of the valid bit array are selected, and a voltage on one of the bit lines of the bit line pair is increased to a logic high voltage. This writes a predetermined logic state into the memory cells of column 110, depending on which bit line is raised. In a preferred embodiment, the voltage on bit line BL* is increased, writing a logic zero into all of the memory cells of column 110. By first discharging the bit line pair before simultaneously writing to all of the memory cells, the pull down transistors of the cells are substantially non-conductive, reducing a possibility of a logic high voltage on one of the storage nodes inadvertently reducing a logic high bit line voltage. Also, discharging all of the memory cells of a column avoids large DC currents in the valid bit arrays.

Figure 5:
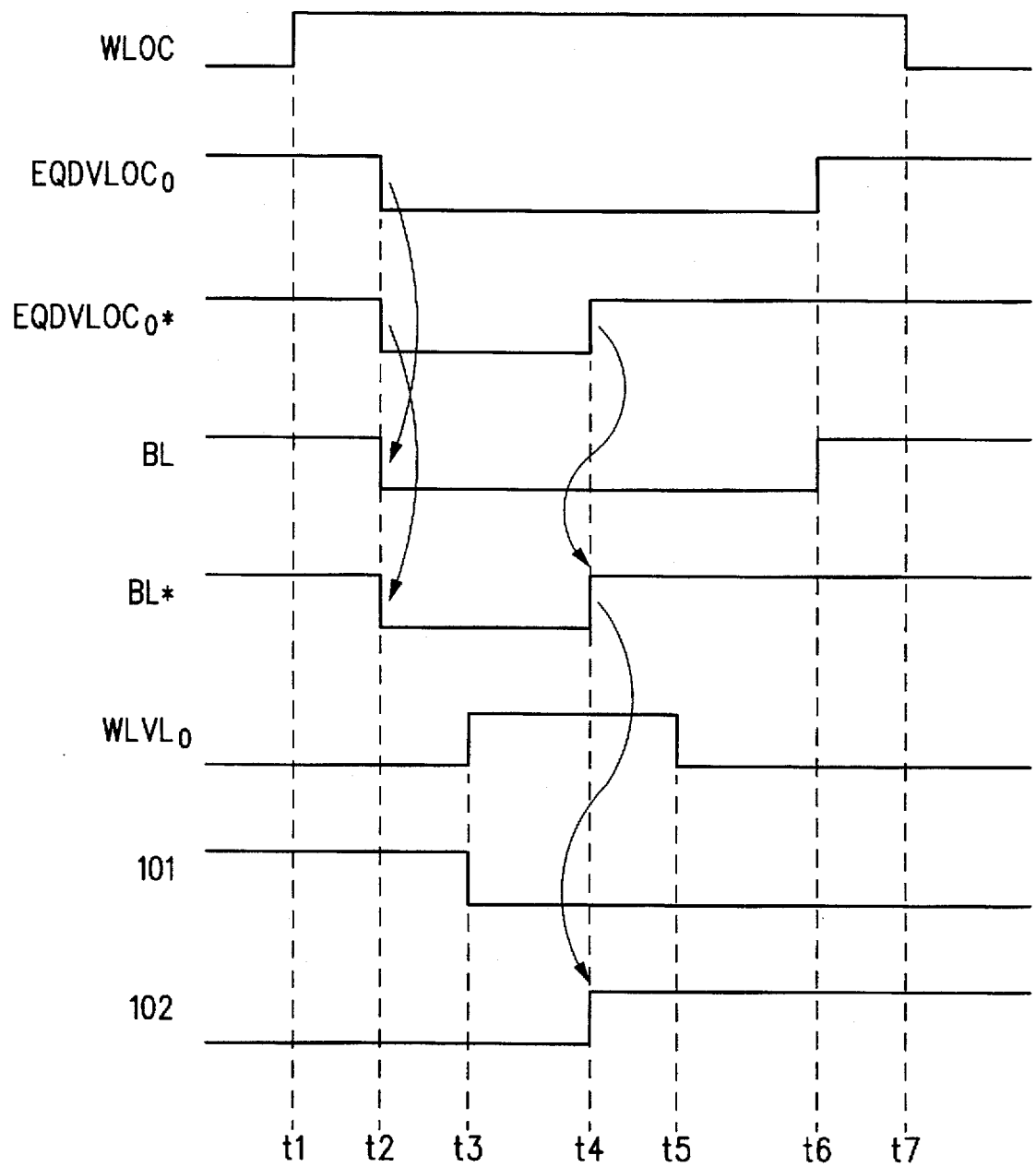
FIG. 5 illustrates a timing diagram of various signals of the cache TAG RAM of FIG. 1 during an invalidation cycle.

FIG. 5 illustrates a timing diagram of various signals of column of memory cells 110 of FIG. 4 during an invalidation cycle. At time t1, decoding signal WLOC is asserted as a logic high voltage, causing N-channel transistors 124 and 125 to be conductive (see FIG. 4). At time t2, differential local write signals $EQDVLOC_0/EQDVLOC_0*$ are both reduced to a logic low voltage, causing bit lines BL and BL* to be reduced to logic low voltages. The word lines, including word line $WLVL_0$, are selected, or increased to logic high voltages, causing access transistors 118–123 to be conductive. Storage nodes 101 and 102 in memory cell 111, and storage nodes in the other memory cells, are reduced to logic low voltages to discharge and equalize the cells, in order to turn off all of the pull-down transistors in preparation for pulling bit line BL* to a logic high voltage. At time t4, local write signal $EQDVLOC_0*$ is increased to a logic high voltage, causing bit line BL* to be increased to a logic high voltage, thus increasing the voltage at storage node 102 to a logic high. This causes cell 111 to store a logic low. At time t5, the voltage on word lines $WLVL_0$, $WLVL_1$, and $WLVL_2$ is reduced to a logic low voltage, deselecting memory cells 111, 112, and 113. At time t6, local write signal $EQDVLOC_0$ is returned to a logic high voltage. At time t7, decoding signal WLOC is reduced to a logic low voltage.

By discharging and equalizing bit lines BL and BL* before writing a logic high voltage to the cells, the possibility of some of the cells storing a logic one instead of a logic zero is reduced.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

What is claimed is:

1. A cache TAG random access memory, comprising:

a TAG array for storing a plurality of TAG addresses;

a valid bit array having a plurality of memory cells coupled to intersecting word lines and bit line pairs, a memory cell of the plurality of memory cells for storing a valid bit corresponding to one of a plurality of TAG addresses, the valid bit array located separate from the TAG array, the valid bit for qualifying a valid hit of the plurality of TAG addresses during a compare cycle of the cache TAG random access memory;

a plurality of word line driver circuits, coupled to the word lines of the valid bit array, the plurality of word line driver circuits for selecting all of the word lines during an invalidation cycle of the valid bit array;

a plurality of write driver circuits, each of the plurality of write driver circuits coupled to a predetermined number of the bit line pairs, the plurality of write driver circuits for sequentially invalidating the valid bit array during the invalidation cycle and for writing to a selected memory cell during a normal write cycle; and an invalidate control circuit, coupled to the valid bit array and to the plurality of local write driver circuits, for selecting the plurality of word lines in the valid bit array and in a predetermined sequence, causing a voltage on each of the bit line pairs to be equalized at about ground potential, and then writing a same predetermined logic state into every memory cell of the valid bit array in response to receiving an invalidate control signal.

2. The cache TAG random access memory of claim 1, further comprising:

a plurality of delay elements, coupled to the plurality of write driver circuits, the plurality of delay elements for sequentially delaying activation of the plurality of write driver circuits for a predetermined time during the invalidation cycle.

3. The cache TAG random access memory of claim 1, wherein the plurality of memory cells are characterized as being a plurality of static random access memory cells.

4. The cache TAG random access memory of claim 1, wherein the valid bit array is invalidated during an invalidation cycle by writing a logic zero to the plurality of memory cells.

* * * * *